US012811122B2

(12) United States Patent
Satoh et al.

(10) Patent No.: US 12,811,122 B2
(45) Date of Patent: Nov. 24, 2026

(54) SECONDARY BATTERY TESTING APPARATUS AND SECONDARY BATTERY TESTING SYSTEM

(71) Applicant: JEOL Ltd., Tokyo (JP)

(72) Inventors: Takashi Satoh, Tokyo (JP); Tetsuo Higuchi, Tokyo (JP); Yoshio Abe, Tokyo (JP); Yoshikazu Sasaki, Tokyo (JP)

(73) Assignee: JEOL Ltd., Tokyo (JP)

( * ) Notice: Subject to any disclaimer, the term of this patent is extended or adjusted under 35 U.S.C. 154(b) by 254 days.

(21) Appl. No.: 18/768,255

(22) Filed: Jul. 10, 2024

(65) Prior Publication Data

US 2025/0022701 A1 Jan. 16, 2025

(30) Foreign Application Priority Data

Jul. 11, 2023 (JP) ................................ 2023-113632

(51) Int. Cl.
*H01M 50/392* (2021.01)
*G01N 1/22* (2006.01)
(Continued)

(52) U.S. Cl.
CPC ........ *H01J 49/0409* (2013.01); *G01N 1/2226* (2013.01); *H01J 49/0427* (2013.01);
(Continued)

(58) Field of Classification Search
CPC .. G01N 33/0009; G01N 33/0031; G01N 1/24; G01N 33/005; G01N 27/12; G01N 21/3504; G01N 33/0006; G01N 27/4077; G01N 27/16; G01N 33/0016; G01N 33/0011; G01N 1/2273; G01N 33/497; G01N 33/0047; G01N 33/0062; G01N 1/22; G01N 2001/022; G01N 29/002; G01N 33/0014; G01N 33/004; G01N 33/0037; G01N 2291/0256; G01N 2001/2223; G01N 1/2247; G01N 27/127; G01N 33/225; G01N 27/407; G01N 2291/0423; G01N 27/122; G01N 33/0004; G01N 27/126; G01N 1/2202; G01N 21/783; G01N 33/0032;
(Continued)

(56) References Cited

FOREIGN PATENT DOCUMENTS

| | | | |
|---|---|---|---|
| CN | 201707183 U | * | 1/2011 |
| CN | 105510174 A | | 4/2016 |

(Continued)

OTHER PUBLICATIONS

Extended European Search Report issued in EP24186644.1 on Dec. 17, 2024.

(Continued)

*Primary Examiner* — Andre J Allen
(74) *Attorney, Agent, or Firm* — The Webb Law Firm

(57) ABSTRACT

A secondary battery is fixed in a sealed container. A first tool unit and a second tool unit are provided on the sealed container. The first tool unit is formed from a first tool and a first holder. The second tool unit is formed from a second tool and a second holder. The first holder holds the first tool while maintaining airtightness of the sealed container, while allowing an advancing/retreating movement and a tilting movement of the first tool. The second holder has a structure similar to that of the first holder.

8 Claims, 7 Drawing Sheets

(51) Int. Cl.
*H01J 49/04* (2006.01)
*H01M 10/44* (2006.01)
*H01M 50/342* (2021.01)

(52) U.S. Cl.
CPC ....... *H01M 10/44* (2013.01); *H01M 50/3425* (2021.01); *H01M 50/392* (2021.01); *G01N 2001/2241* (2013.01)

(58) Field of Classification Search
CPC .. G01N 1/2205; G01N 1/405; G01N 33/0036; G01N 1/2214; G01N 33/0063; G01N 1/26; G01N 2001/024; G01N 2030/025; G01N 33/0073; G01N 1/40; G01N 29/024; G01N 1/2226; G01N 27/18; G01N 27/128; G01N 27/622; G01N 33/0026; G01N 2001/025; G01N 33/0027; G01N 33/007; G01N 7/00; G01N 1/2252; G01N 1/2258; G01N 2291/0215; G01N 27/4078; G01N 30/00; G01N 21/274; G01N 2291/02809; G01N 2291/0426; G01N 1/2208; G01N 1/38; G01N 2001/4066; G01N 27/125; G01N 31/22; G01N 7/04; G01N 2001/2276; G01N 2291/02863; G01N 2291/02881; G01N 27/4071; G01N 27/74; G01N 15/0255; G01N 2291/0255; G01N 2291/0427; G01N 25/18; G01N 27/4074; G01N 33/0013; G01N 27/4065; G01N 29/036; G01N 31/12; G01N 33/0054; G01N 15/065; G01N 2001/028; G01N 27/185; G01N 27/404; G01N 2015/0046; G01N 27/4045; G01N 27/419; G01N 29/222; G01N 33/0057; G01N 21/7703; G01N 33/00; G01N 1/34; G01N 2021/399; G01N 21/766; G01N 22/00; G01N 2291/0217; G01N 2291/02836; G01N 27/124; G01N 27/70; G01N 30/88; G01N 33/0075; G01N 1/2294; G01N 2001/2261; G01N 2015/019; G01N 2021/1793; G01N 21/05; G01N 33/4972; G01N 1/02; G01N 1/2211; G01N 2001/2264; G01N 21/33; G01N 27/4062; G01N 27/4067; G01N 27/4162; G01N 33/0034; G01N 33/0039; G01N 33/0098; G01N 2001/225; G01N 2001/2267; G01N 21/359; G01N 21/59; G01N 21/85; G01N 2291/106; G01N 27/123; G01N 27/62; G01N 27/626; G01N 27/68; G01N 29/326; G01N 33/0001; G01N 33/0022; G01N 33/2025; G01N 2001/2285; G01N 2021/1704; G01N 21/61; G01N 30/6095; G01N 30/7206; G01N 33/0049; G01N 33/24; G01N 7/10; G01N 1/4022; G01N 1/44; G01N 15/06; G01N 2001/007; G01N 2015/0261; G01N 2021/3545; G01N 2030/3007; G01N 21/3518; G01N 21/39; G01N 21/77; G01N 2291/014; G01N 27/414; G01N 27/4141; G01N 33/0018; G01N 33/0065; G01N 33/025; G01N 33/18; G01N 33/2823; G01N 35/1097; G01N 2001/005; G01N 2001/021; G01N 2001/2241; G01N 2001/227; G01N 2021/7786; G01N 2030/009; G01N 2030/8881; G01N 21/1702; G01N 21/76; G01N 2291/021; G01N 27/4175; G01N 29/4418; G01N 30/12; G01N 30/20; G01N 31/223; G01N 31/224; G01N 33/0044; G01N 33/28; G01N 33/2835; G01N 33/2841; G01N 33/442; G01N 7/14; G01N 1/14; G01N 1/4055; G01N 2001/2238; G01N 2001/245; G01N 2021/7783; G01N 2027/222; G01N 2030/8405; G01N 21/031; G01N 21/65; G01N 2291/0212; G01N 2291/0222; G01N 2291/02872; G01N 25/36; G01N 27/121; G01N 27/221; G01N 27/4075; G01N 27/64; G01N 29/2481; G01N 29/30; G01N 31/005; G01N 33/0024; G01N 33/006; G01N 33/0067; G01N 33/2852; G01N 9/36; G01N 15/0826; G01N 2021/772; G01N 21/6402; G01N 21/718; G01N 2201/1215; G01N 2291/011; G01N 25/56; G01N 27/041; G01N 27/223; G01N 27/416; G01N 27/417; G01N 29/2418; G01N 30/24; G01N 30/78; G01N 33/0029; G01N 33/1826; G01N 35/00871; G01N 1/4077; G01N 13/00; G01N 15/082; G01N 15/1456; G01N 2001/1093; G01N 2001/2229; G01N 2001/2235; G01N 2001/2282; G01N 2001/242; G01N 2001/4033; G01N 2015/0026; G01N 2015/0288; G01N 2015/1486; G01N 2021/3513; G01N 2021/6432; G01N 2021/7773; G01N 2030/121; G01N 2030/128; G01N 21/37; G01N 21/6428; G01N 21/643; G01N 21/716; G01N 2291/02818; G01N 25/54; G01N 27/00; G01N 27/023; G01N 27/226; G01N 27/4143; G01N 29/2475; G01N 29/4436; G01N 29/4481; G01N 30/06; G01N 30/08; G01N 30/30; G01N 30/62; G01N 30/72; G01N 30/84; G01N 31/00; G01N 33/0052; G01N 33/0081; G01N 33/02; G01N 33/1806; G01N 33/2829; G01N 33/48714; G01N 33/493; G01N 33/54386; G01N 7/18; G01N 15/0618; G01N 15/0656; G01N 2021/655; G01N 2030/525; G01N 2030/642; G01N 21/6404; G01N 21/8483; G01N 2203/0286; G01N 25/50; G01N 27/04; G01N 27/129; G01N 27/14; G01N 27/305; G01N 27/49; G01N 27/66; G01N 29/02; G01N 30/02; G01N 30/50; G01N 30/64; G01N 30/68; G01N 33/205; G01N 33/54373; G01N 35/1095; G01N 9/00; G01N 9/30; G01N 1/10; G01N 1/2035; G01N 11/06; G01N 11/08; G01N 15/0205; G01N 15/0227; G01N 15/0266; G01N 15/0637; G01N 19/00; G01N 2001/2217; G01N 2001/248; G01N 2001/2833; G01N 2001/4027; G01N 2021/3129; G01N 2021/3137; G01N 2021/8557; G01N 2021/8578; G01N 2030/062; G01N 2030/085; G01N 2030/125; G01N 2030/201; G01N 2030/202; G01N 2030/3084; G01N 2030/8423; G01N 2030/8804; G01N 2030/8809; G01N 2030/884; G01N 2035/00158; G01N 21/00; G01N 21/15;

G01N 21/25; G01N 21/645; G01N 21/648; G01N 21/69; G01N 21/72; G01N 2201/08; G01N 2291/102; G01N 25/14; G01N 25/142; G01N 25/28; G01N 25/72; G01N 27/021; G01N 27/4148; G01N 27/624; G01N 27/72; G01N 29/323; G01N 30/60; G01N 30/66; G01N 30/7233; G01N 30/8651; G01N 31/222; G01N 33/0045; G01N 33/0059; G01N 33/0072; G01N 33/287; G01N 33/46; G01N 33/50; G01N 35/00009; G01N 35/00693; G01N 7/02; G01N 7/16; G01N 9/32; G01N 1/28; G01N 11/02; G01N 15/0272; G01N 15/075; G01N 17/00; G01N 19/10; G01N 2001/045; G01N 2001/105; G01N 2001/2255; G01N 2001/247; G01N 2001/2893; G01N 2001/383; G01N 2001/388; G01N 2015/0092; G01N 2021/1725; G01N 2021/354; G01N 2021/3595; G01N 2021/653; G01N 2030/324; G01N 2030/328; G01N 2030/625; G01N 2030/626; G01N 2030/8854; G01N 2030/8886; G01N 21/09; G01N 21/314; G01N 21/6554; G01N 21/3577; G01N 21/43; G01N 21/552; G01N 21/63; G01N 2201/023; G01N 2201/1211; G01N 2201/12792; G01N 2203/0023; G01N 25/00; G01N 25/48; G01N 25/4873; G01N 25/68; G01N 27/225; G01N 27/227; G01N 27/304; G01N 27/40; G01N 27/41; G01N 27/4118; G01N 27/4163; G01N 29/228; G01N 29/449; G01N 30/22; G01N 30/32; G01N 30/8606; G01N 30/8641; G01N 31/225; G01N 33/0042; G01N 33/06; G01N 33/1846; G01N 33/20; G01N 33/227; G01N 33/48707; G01N 33/4925; G01N 33/5308; G01N 35/00; G01N 35/085; G01N 1/4044; G01N 11/04; G01N 11/16; G01N 13/04; G01N 15/02; G01N 15/042; G01N 15/0606; G01N 15/0625; G01N 15/1031; G01N 15/1404; G01N 15/1434; G01N 15/1459; G01N 17/04; G01N 19/08; G01N 2001/002; G01N 2001/1018; G01N 2001/149; G01N 2001/205; G01N 2001/2244; G01N 2001/2279; G01N 2001/2297; G01N 2001/241; G01N 2001/385; G01N 2013/003; G01N 2015/0007; G01N 2015/0011; G01N 2015/0038; G01N 2015/0096; G01N 2015/0687; G01N 2015/084; G01N 2015/086; G01N 2015/0873; G01N 2021/158; G01N 2021/1723; G01N 2021/1795; G01N 2021/258; G01N 2021/3107; G01N 2021/3133; G01N 2021/3148; G01N 2021/3166; G01N 2021/3174; G01N 2021/3185; G01N 2021/3531; G01N 2021/3536; G01N 2021/391; G01N 2021/458; G01N 2021/635; G01N 2021/6419; G01N 2021/6482; G01N 2021/7726; G01N 2021/845; G01N 2021/8494; G01N 2021/8585; G01N 2030/008; G01N 2030/027; G01N 2030/205; G01N 2030/3015; G01N 2030/303; G01N 2030/3038; G01N 2030/3046; G01N 2030/3076; G01N 2030/402; G01N 2030/528; G01N 2030/645; G01N 2030/685; G01N 2030/765; G01N 2030/862; G01N 2030/8863; G01N 2035/00237; G01N 2035/00683; G01N 21/0303; G01N 21/0332; G01N 21/13; G01N 21/17; G01N 21/171; G01N 21/276; G01N 21/29; G01N 21/293; G01N 21/31; G01N 21/3103; G01N 21/3563; G01N 21/45; G01N 21/4788; G01N 21/53; G01N 21/553; G01N 21/554; G01N 21/658; G01N 21/67; G01N 21/68; G01N 21/774; G01N 21/7743; G01N 21/84; G01N 2201/0214; G01N 2201/062; G01N 2201/0627; G01N 2201/127; G01N 2201/12715; G01N 2201/128; G01N 2203/0057; G01N 2203/0075; G01N 2203/0094; G01N 2203/0676; G01N 2291/012; G01N 2291/0224; G01N 2291/048; G01N 2291/101; G01N 2333/37; G01N 2333/916; G01N 25/02; G01N 25/06; G01N 25/08; G01N 25/12; G01N 25/16; G01N 25/30; G01N 25/34; G01N 2600/00; G01N 2610/00; G01N 27/002; G01N 27/026; G01N 27/045; G01N 27/048; G01N 27/06; G01N 27/07; G01N 27/20; G01N 27/26; G01N 27/286; G01N 27/30; G01N 27/308; G01N 27/3271; G01N 27/3275; G01N 27/4072; G01N 27/4073; G01N 27/4076; G01N 27/4114; G01N 27/4145; G01N 27/4146; G01N 2800/06; G01N 2800/32; G01N 29/032; G01N 29/048; G01N 29/0672; G01N 29/22; G01N 29/227; G01N 29/2462; G01N 29/265; G01N 29/28; G01N 29/42; G01N 29/4427; G01N 29/4472; G01N 30/16; G01N 30/18; G01N 30/461; G01N 30/463; G01N 30/466; G01N 30/468; G01N 30/6004; G01N 30/6043; G01N 30/6069; G01N 30/70; G01N 30/722; G01N 30/74; G01N 30/8624; G01N 30/8634; G01N 30/8662; G01N 30/8665; G01N 31/10; G01N 31/226; G01N 33/0021; G01N 33/0055; G01N 33/0068; G01N 33/0085; G01N 33/0095; G01N 33/0096; G01N 33/12; G01N 33/146; G01N 33/1866; G01N 33/1886; G01N 33/2811; G01N 33/343; G01N 33/36; G01N 33/383; G01N 33/388; G01N 33/445; G01N 33/48728; G01N 33/5008; G01N 33/54366; G01N 33/551; G01N 33/84; G01N 33/9473; G01N 33/98; G01N 35/00732; G01N 35/08; G01N 5/00; G01N 5/02; G01N 7/08; G01N 9/002; G01N 9/04; G01N 9/16; G01N 9/20; G01N 9/266; G01N 1/00; G01N 1/18; G01N 1/286; G01N 11/00; G01N 15/00; G01N 15/04; G01N 15/0612; G01N 15/088; G01N 15/149; G01N 17/006; G01N 17/088; G01N 2001/1436; G01N 2001/2071; G01N 2001/2866; G01N 2001/387; G01N

2015/138; G01N 2021/0112; G01N 2021/1744; G01N 2021/1763; G01N 2021/1785; G01N 2021/3125; G01N 2021/5957; G01N 2021/5969; G01N 2021/633; G01N 2021/6439; G01N 2021/8405; G01N 2021/8887; G01N 2030/0095; G01N 2030/8813; G01N 2035/00881; G01N 21/35; G01N 21/49; G01N 21/5907; G01N 21/5911; G01N 21/636; G01N 21/78; G01N 21/8851; G01N 21/94; G01N 22/005; G01N 2201/022; G01N 2201/061; G01N 2201/06186; G01N 2201/066; G01N 2201/105; G01N 2201/1288; G01N 2203/0025; G01N 2203/0032; G01N 2203/0087; G01N 2291/0258; G01N 23/00; G01N 23/2273; G01N 25/22; G01N 25/482; G01N 25/4826; G01N 25/4846; G01N 25/4893; G01N 27/228; G01N 27/409; G01N 27/413; G01N 27/623; G01N 29/14; G01N 29/2468; G01N 3/24; G01N 30/46; G01N 30/86; G01N 33/0019; G01N 33/1813; G01N 33/202; G01N 33/2028; G01N 33/222; G01N 33/241; G01N 33/487; G01N 33/4975; G01N 33/4977; G01N 33/9406; G01N 35/00603; G01N 35/10; G01N 35/1016; H01M 8/04089; H01M 8/04679; H01M 8/0447; H01M 8/0444; H01M 8/04097; H01M 2250/20; H01M 2008/1095; H01M 8/04007; H01M 8/04955; H01M 8/241; H01M 2004/8684; H01M 4/96; H01M 8/0247; H01M 8/04201; H01M 8/04216; H01M 8/0432; H01M 8/04522; H01M 8/1004; H01M 8/247; H01M 10/052; H01M 10/48; H01M 2004/021; H01M 4/8657; H01M 8/04228; H01M 8/04753; H01M 4/583; H01M 4/8867; H01M 8/0267; H01M 8/04208; H01M 8/04303; H01M 8/04447; H01M 8/04761; H01M 8/0662; H01M 8/0668; H01M 10/0525; H01M 10/4228; H01M 10/486; H01M 16/006; H01M 2004/027; H01M 4/02; H01M 4/0402; H01M 4/0404; H01M 4/0409; H01M 4/133; H01M 4/1393; H01M 4/587; H01M 4/622; H01M 4/623; H01M 4/92; H01M 8/0234; H01M 8/04231; H01M 8/04686; H01M 8/0612; H01M 8/0618; H01M 10/4285; H01M 10/482; H01M 10/613; H01M 10/615; H01M 10/625; H01M 10/6556; H01M 10/6563; H01M 4/366; H01M 4/383; H01M 4/8605; H01M 4/8673; H01M 4/8875; H01M 50/109; H01M 50/30; H01M 6/36; H01M 8/0258; H01M 8/04119; H01M 8/04126; H01M 8/04156; H01M 8/04223; H01M 8/04388; H01M 8/04402; H01M 8/04425; H01M 8/04455; H01M 8/04462; H01M 8/04492; H01M 8/04507; H01M 8/04514; H01M 8/04589; H01M 8/04738; H01M 8/04746; H01M 8/0488; H01M 8/04992; H01M 8/065; H01M 8/1007; H01M 8/16; H01M 8/242; H01M 8/2457; H01M 8/2465; H01M 10/425; H01M 2010/4278; H01M 2200/00; H01M 4/04; H01M 4/8642; H01M 50/24; H01M 50/317; H01M 50/3425; H01M 50/375; H01J 49/0422; H01J 37/32935; H01J 37/3244; H01J 37/32981; H01J 49/0463; H01J 49/067; H01J 49/04; H01J 49/0027; H01J 49/0409; H01J 49/0445; H01J 49/0468; H01J 49/10; H01J 9/42; H01J 49/049; H01J 49/162; H01J 49/38; H01J 29/865; H01J 37/32174; H01J 37/32449; H01J 37/32623; H01J 37/32642; H01J 41/04; H01J 49/0031; H01J 49/0404; H01J 49/0472; H01J 7/42; H01J 9/241; H01J 49/0009; H01J 49/0427; H01J 49/0459; H01J 49/105; H01J 49/24; H01J 9/24

See application file for complete search history.

(56) References Cited

FOREIGN PATENT DOCUMENTS

| | | | | | |
|---|---|---|---|---|---|
| CN | 105510174 | B | * | 12/2018 | |
| CN | 109935919 | B | * | 5/2022 | |
| EP | 4343940 | A1 | * | 3/2024 | .......... H01M 10/441 |
| JP | H06186007 | A | | 7/1994 | |
| JP | 2002313437 | A | | 10/2002 | |
| JP | 2007234393 | A | * | 9/2007 | |
| JP | 2011003513 | A | | 1/2011 | |
| JP | 2015072266 | A | * | 4/2015 | |
| JP | 6190783 | B2 | | 8/2017 | |
| KR | 102397294 | B1 | * | 5/2022 | ............... G01N 1/22 |
| KR | 20260019274 | A | * | 2/2026 | .......... H01M 50/103 |

OTHER PUBLICATIONS

Machine English-language translation of JP2002313437A, the original of which was cited in the IDS filed on Jul. 10, 2024.

Kumai et al., Gas generation mechanism due to electrolyte decomposition in commercial lithium-ion cell, Journal of Sources, vol. 81-82, 1999, pp. 715-719.

* cited by examiner

SECONDARY BATTERY TESTING APPARATUS AND SECONDARY BATTERY TESTING SYSTEM

CROSS REFERENCE TO RELATED APPLICATION

This application claims priority to Japanese Patent Application No. 2023-113632 filed Jul. 11, 2023, the disclosure of which is hereby incorporated by reference in its entirety.

BACKGROUND OF THE DISCLOSURE

Field of the Disclosure

The present disclosure relates to a secondary battery testing apparatus and a secondary battery testing system, and in particular to a system which measures gas generated by a secondary battery.

Description of Related Art

Various secondary battery testing apparatuses have been proposed. Each of these secondary battery testing apparatuses performs tests on a particular type of secondary battery. Realization of a secondary battery testing apparatus having a general-purpose property; that is, a secondary battery testing apparatus which can perform tests on secondary batteries of various sizes or of various types, is desired.

A secondary battery testing apparatus has a tool for forming an opening such as a cut or a hole on an outer housing of the secondary battery. In the secondary battery test, a gas leaking from the opening or a gas generated from contents leaking from the opening is analyzed. JP 2002-313437 A, JP H6-186007 A, and Kazuma Kumai et al., Gas generation mechanism due to electrolyte decomposition in commercial lithium-ion cell, Journal of Power Sources, 81-82, 1999, pp. 715-719 disclose apparatuses for testing a primary battery or a secondary battery. All of these apparatuses have a tool for forming an opening on an outer housing of the battery. In all of these tools, only an advancing/retreating movement is allowed.

In the secondary battery test, an opening must be formed at an appropriate position on the outer housing of the secondary battery. The appropriate position is, for example, a position where electrical short-circuiting can be avoided, or a position at which release of gas can be expected. In realizing the secondary battery testing apparatus having the general-purpose property, realization of a tool which can form an opening at a desired position on the outer housing of the secondary battery is desired.

SUMMARY OF THE DISCLOSURE

An advantage of the present disclosure lies in provision of a secondary battery testing apparatus which can perform tests of secondary batteries having various sizes or various forms. Alternatively, another advantage of the present disclosure lies in provision of a secondary battery testing apparatus which can form an opening at a desired position on an outer housing of the secondary battery.

According to one aspect of the present disclosure, there is provided a secondary battery testing apparatus comprising: a sealed container; a fixing device that detachably fixes a secondary battery in the sealed container; a first tool that has a first tip part which forms an opening on an outer housing of the secondary battery in the sealed container, and a first handle manipulated by a user outside the sealed container; a first holder provided on the sealed container, that holds the first tool while maintaining airtightness of the sealed container, and while allowing an advancing/retreating movement and a tilting movement of the first tool; and a release outlet provided on the sealed container, that releases gas released from the secondary battery.

According to another aspect of the present disclosure, there is provided a secondary battery testing system comprising: the secondary battery testing apparatus described above; a gas measurement apparatus that measures gas released from the release outlet; and a trap apparatus provided between the release outlet and the gas measurement apparatus, that traps contents released from the secondary battery other than the gas.

BRIEF DESCRIPTION OF THE DRAWINGS

Embodiment(s) of the present disclosure will be described based on the following figures, wherein.

DESCRIPTION OF NON-LIMITING EMBODIMENTS OF THE DISCLOSURE

Figure 1:
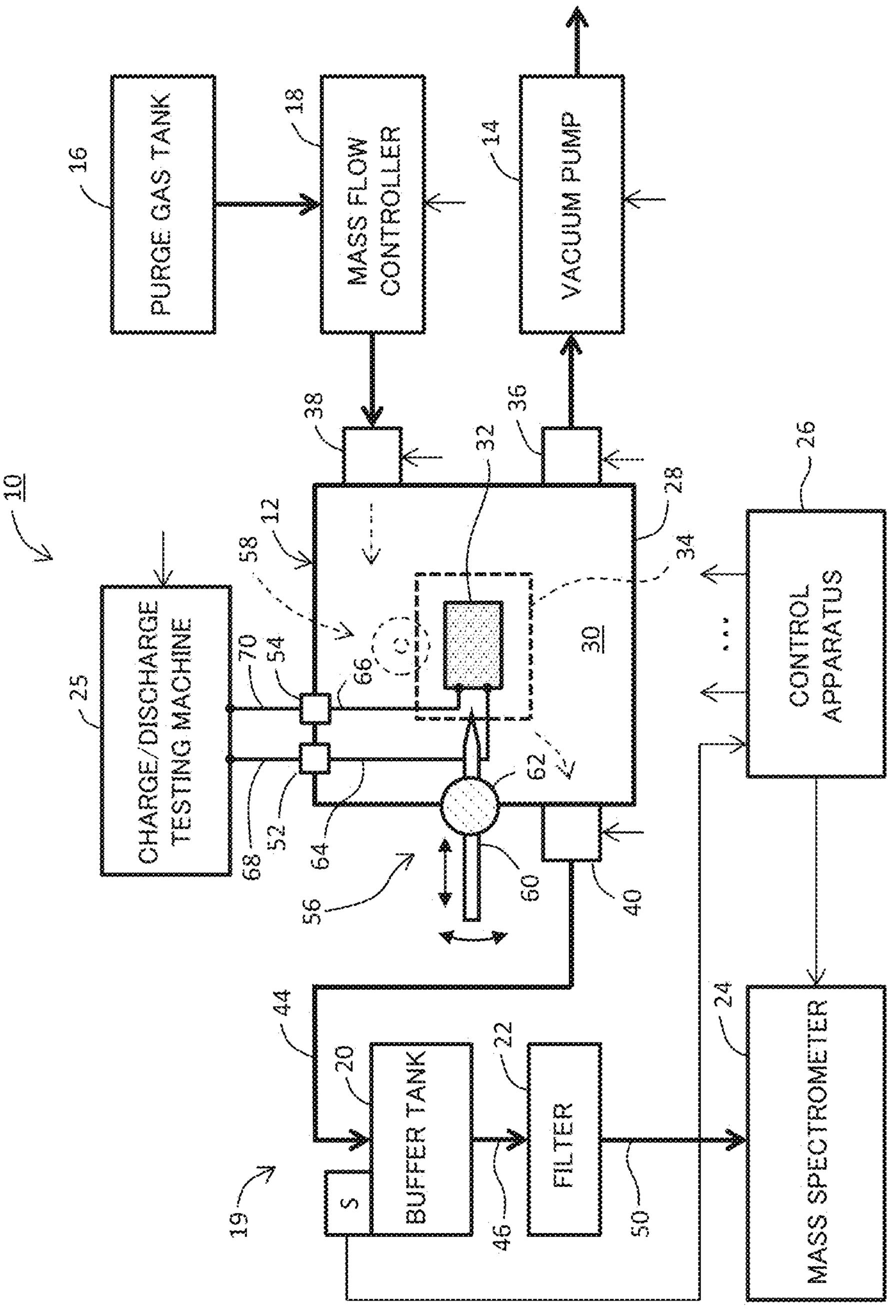
FIG. 1 is a diagram showing a secondary battery testing system according to an embodiment of the present disclosure.

An embodiment of the present disclosure will now be described with reference to the drawings.

(1) Overview of Embodiment

A secondary battery testing apparatus according to an embodiment of the present disclosure comprises a sealed container, a fixing device, a first tool, a first holder, and a release outlet. The fixing device is a device which detachably fixes a secondary battery in the sealed container. The first tool has a first tip part which forms an opening on an outer housing of the secondary battery in the sealed container, and a first handle manipulated by a user outside the sealed container. The first holder is provided on the sealed container, and holds the first tool while maintaining airtightness of the sealed container, while allowing an advancing/retreating movement and a tilting movement of the first tool. The release outlet is provided on the sealed container, and releases gas released from the secondary battery.

According to the structure described above, because the tilting movement of the first tool is allowed in addition to the advancing/retreating movement of the first tool, an opening can be formed over a wide range on the outer housing of the secondary battery fixed in the sealed container. For example, the opening may be formed approximately perpendicular to a direction of layering of electrodes in the secondary battery (direction of alternate layering of a plurality of positive electrodes and a plurality of negative electrodes), so as to achieve advantages that short-circuiting between the positive and negative electrodes due to formation of the opening can be avoided, and that a charge/discharge test of the secondary battery can be performed even after the formation of the opening.

Each of the first tool and the first holder has a virtual center axis. The advancing/retreating movement of the first tool is a movement along the center axis of the first tool. The tilting movement of the first tool is a movement to tilt (or rotate) the center axis of the first tool with respect to the center axis of the first holder. The tilting movement of the first tool results in an oscillating movement or a swinging movement of the first tool.

By forming an opening on the outer housing of the secondary battery in a state in which the secondary battery is housed in the sealed container, mixing of the gas generated from the secondary battery with atmospheric air can be avoided. Alternatively, a direction or an orientation of the secondary battery may be selected during fixation of the secondary battery by the fixing device. In an embodiment of the present disclosure, the fixing device has a sliding structure, an expanding/contracting structure, a flexible fixing member, or the like.

A secondary battery testing apparatus according to an embodiment of the present disclosure further comprises a second tool and a second holder. The second tool has a second tip part which forms an opening on the outer housing of the secondary battery in the sealed container, and a second handle manipulated by the user outside the sealed container. The second holder is provided on the sealed container at a position distanced from the first holder, and holds the second tool while maintaining airtightness of the sealed container, while allowing an advancing/retreating movement and a tilting movement of the second tool.

According to the structure described above, because the first tool and the second tool are provided at different positions, the opening can be formed in a wider range over the outer housing of the secondary battery fixed in the sealed container. In an embodiment of the present disclosure, the first holder and the second holder are placed in such a manner that the center axis of the first holder and a center axis of the second holder intersect each other; that is, the first holder and the second holder respectively oppose two outer surfaces of the secondary battery.

In an embodiment of the present disclosure, the sealed container has a side plate and a ceiling plate. The first holder is provided on the side plate. The second holder is provided on the ceiling plate. For example, a first outer surface of the secondary battery fixed in the sealing container faces the side plate, and a second outer surface of the secondary battery faces the ceiling plate. In this case, an opening is formed by the first tool on the first outer surface, or an opening is formed by the second tool on the second outer surface. Normally, one opening is formed, but alternatively, a plurality of openings may be formed. Alternatively, three or more tools and three or more holders may be provided.

Each of the second tool and the second holder has a center axis. The advancing/retreating movement of the second tool is a movement along the center axis of the second tool. The tilting movement of the second tool is a movement to tilt the center axis of the second tool with respect to the center axis of the second holder.

In an embodiment of the present disclosure, each of the first tip part and the second tip part is formed from a non-conductive material. According to this structure, short-circuiting in the secondary battery via the tool as a medium can be prevented, and electric shock can be prevented. Alternatively, each of the tools as a whole may be formed from a non-conductive material.

In an embodiment of the present disclosure, all or a part of the sealing container is transparent. With this structure, the secondary battery fixed in the sealed container can be observed from outside the sealed container. According to this structure, an opening can be formed on the outer housing of the secondary battery using the first tool or the second tool while observing the secondary battery.

A secondary battery testing apparatus according to an embodiment of the present disclosure further comprises a first relay terminal, a second relay terminal, a first internal cable, and a second internal cable. The first relay terminal and the second relay terminal are provided on the sealed container. The first internal cable connects a first terminal of the secondary battery and the first realty terminal. The second internal cable connects a second terminal of the secondary battery and the second relay terminal. Each of the first relay terminal and the second relay terminal is a terminal connected to a charge/discharge testing machine. According to this structure, the charge/discharge test of the secondary battery can be performed while the secondary battery is continued to be placed in the sealed container. Gas generated during the charge/discharge test is measured.

According to another aspect of the present disclosure, there is provided a secondary battery testing system comprising: the secondary battery testing apparatus described above; a gas measurement apparatus that measures gas released from the release outlet of the secondary battery testing apparatus; and a trap apparatus provided between the release outlet of the secondary battery testing apparatus and the gas measurement apparatus, that traps contents released from the secondary battery other than the gas. According to this structure, because the trap apparatus is provided, contamination of the gas measurement apparatus by the contents other than the gas can be prevented or reduced. The trap apparatus is an apparatus which traps liquid and solid particles.

In an embodiment of the present disclosure, the trap apparatus comprises a buffer tank which stores the contents other than the gas, and a filter provided downstream of the buffer tank, which blocks passage of the contents other than the gas. According to this structure, because two types of traps function stepwise, the contamination of the gas measurement apparatus can be effectively prevented.

(2) Details of Embodiment

FIG. 1 shows an example structure of a secondary battery testing system according to an embodiment of the present disclosure. A secondary battery which is a target of the test is, for example, a chargeable lithium-ion battery. According to the secondary battery testing system of the embodiment of the present disclosure, with the structures described below, secondary batteries of various types and various sizes can be tested.

In FIG. 1, a secondary battery testing system 10 comprises a secondary battery testing apparatus 12, a vacuum pump 14, a purge gas tank 16, a mass flow controller 18, a trap apparatus 19, a mass spectrometer 24, a charge/discharge testing machine 25, a control apparatus 26, and other components.

The secondary battery testing apparatus 12 has a sealed container 28. An internal space 30 of the sealed container 28 is an airtight space. A secondary battery 32 is placed in the internal space 30. Specifically, the secondary battery 32 is detachably fixed on a bottom plate of the sealed container 28 by a fixing device 34.

A release port 36, an introduction port 38, and a release port 40 are provided on the sealed container 28. The release ports 36 and 40 are release outlets. The introduction port 38 is an introduction inlet. The vacuum pump 14 is connected to the release port 36. The purge gas tank 16 is connected to the introduction port 38 via the mass flow controller 18. The mass spectrometer 24 is connected to the release port 40 via the trap apparatus 19.

The vacuum pump 14 is an apparatus for removing internal gas such as air from inside of the sealed container 28, to form a vacuum therein. The purge gas tank 16 is filled with an inert gas such as helium gas or argon gas, serving as a purge gas. After a vacuum is formed in the sealed container 28, the purge gas is sent to the inside of the sealed container 28. In this process, a flow rate of the purge gas is controlled by the mass flow controller 18. As will be described later, after the introduction of the purge gas is started, an opening is formed on an outer housing of the secondary battery. Gas existing in the secondary battery 32 leaks through the opening, or gas is generated from contents leaking through the opening.

The gas released from the release port 40 is sent to the mass spectrometer 24 serving as a gas measurement apparatus, through the trap apparatus 19. The mass spectrometer 24 is formed from an ion source, a mass analyzer, an ion detector, an information processing apparatus, and other components. With the mass spectrometer 24, a mass spectrum of the gas is produced. Based on the mass spectrum, one or a plurality of components included in the gas are specified. Alternatively, a gas chromatograph or the like may be provided between the secondary battery testing apparatus 12 and the mass spectrometer 24.

The trap apparatus 19 has a buffer tank 20 and a filter 22 which are connected in series. A tube 44 is provided between the release port 40 of the sealed container 28 and an introduction port of the buffet tank 20, a tube 46 is provided between a release port of the buffer tank 20 and an introduction port of the filter 22, and a tube 50 is provided between a release port of the filter 22 and the mass spectrometer 24. Each of the tubes 44, 46, and 50 is, for example, a capillary tube. On the buffer tank 20, a pressure sensor S for detecting a pressure inside the tank is provided.

The control apparatus 26 is formed from an information processing apparatus such as a computer. The control apparatus 26 controls operations of various elements of the secondary battery testing system 10. A detection signal from the pressure sensor S is input to the control apparatus 26. Alternatively, the information processing apparatus in the mass spectrometer 24 may function as the control apparatus 26. Alternatively, the operations of various elements of the secondary battery testing system 10 may be manually switched.

The secondary battery testing apparatus 12 according to the embodiment comprises a first tool unit 56 and a second tool unit 58 provided on the sealed container 28. The first tool unit 56 is formed from a first tool 60 and a first holder 62. The second tool unit 58 is formed from a second tool and a second holder. The first tool unit 56 and the second tool unit 58 are selectively used. The tool units will be described later in detail.

A first terminal (first relay terminal) 52 and a second terminal (second relay terminal) 54 are provided on the sealed container 28. One terminal of the secondary battery 32 is electrically connected to the first terminal 52 via a cable 64, and the other terminal of the secondary battery 32 is electrically connected to the second terminal 54 via a cable 66. The first terminal 52 and the second terminal 54 are electrically connected to the charge/discharge testing machine 25 via cables 68 and 70, respectively.

The charge/discharge testing machine 25 is used as necessary, and controls charging and discharging of the secondary battery. Gases released from the secondary battery during the processes of charging and discharging the secondary battery are measured.

In FIG. 1, elements other than the secondary battery testing apparatus 12 are used as necessary or are provided as necessary. In place of the mass spectrometer 24, another measurement apparatus may be placed. Further, other devices may be added to the secondary battery testing system 10.

Figure 2:
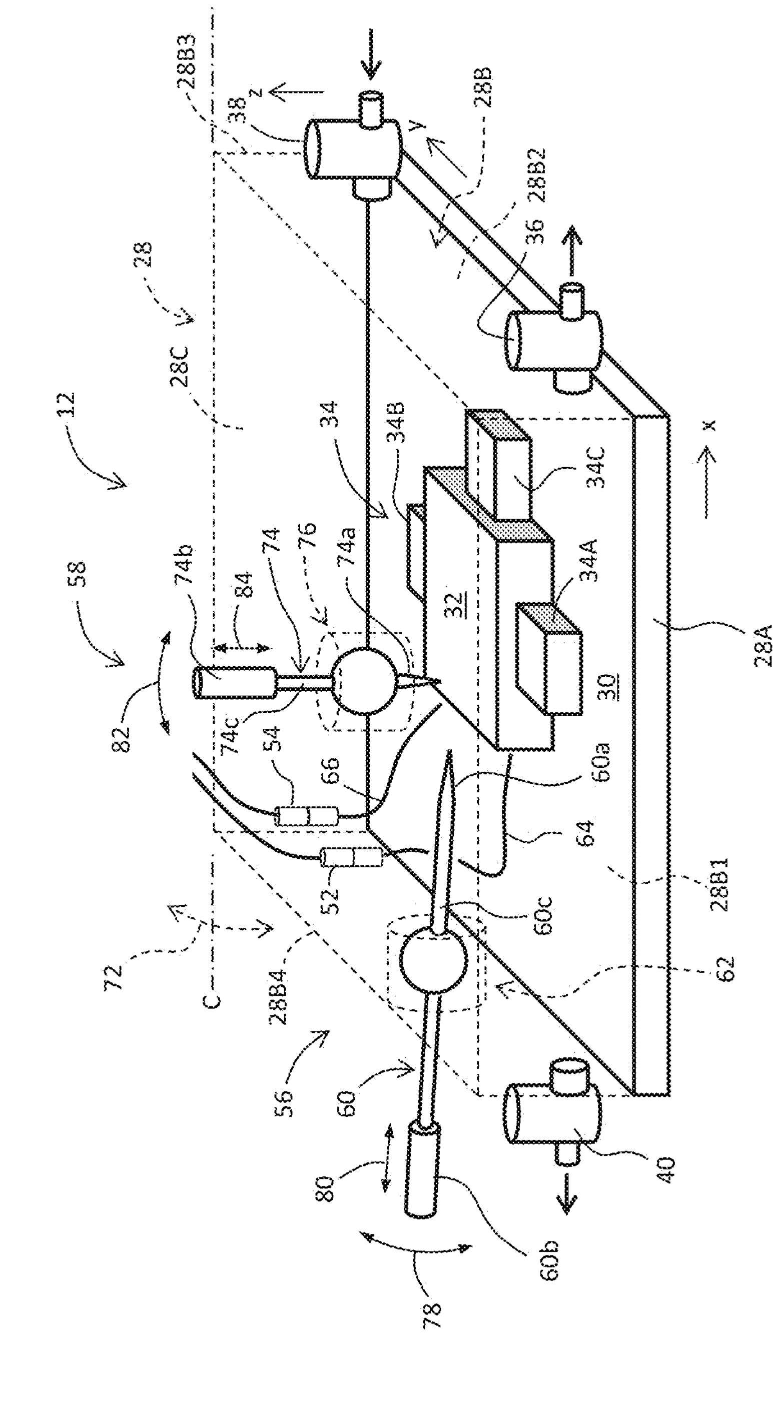
FIG. 2 is a diagram showing the secondary battery testing apparatus according to the embodiment.

FIG. 2 shows the configuration of the secondary battery testing apparatus 12. Elements in FIG. 2 that are identical to the elements shown in FIG. 1 are assigned the same reference numerals.

The sealed container 28 is a container having airtightness, pressure endurance, and an electrical insulating property. The sealed container 28 is formed from a bottom plate 28A, a frame 28B, and a ceiling plate 28C. These members are formed from, for example, polycarbonate. All or a part of the frame 28B is transparent, and, similarly, all or a part of the ceiling plate 28C is transparent. A user can observe the secondary battery 32 in the sealed container 28 through the transparent parts.

The frame 28B is formed from four side plates 28B1~28B4. Each of the side plates 28B1~28B4 is a vertical plate. The side plates 28B1 and 28B3 are orthogonal to a y direction, and the side plates 28B2 and 28B4 are orthogonal to an x direction.

The ceiling plate 28C moves to open and close. In a closed state thereof, the ceiling plate 28C has a horizontal orientation. A sealing member (not shown) is provided between the ceiling plate 28C and the frame 28B. In the illustrated example configuration, the ceiling plate 28C rotates (refer to reference numeral 72) about a rotational axis C. A hinge is provided between the frame 28B and the ceiling plate 28C, but the hinge is not illustrated in the figures. A size of the sealed container 28 in the x direction is, for example, 30 cm, a size in the y direction is, for example, 30 cm, and a size in a z direction is, for example, 5 cm.

In the illustrated example configuration, the secondary battery 32 is detachably fixed on the bottom plate 28A by the fixing device 34. The fixing device 34 is formed from a plurality of sliders 34A, 34B, and 34C. The secondary battery 32 is constrained by the sliders 34A, 34B, and 34C. The sliders 34A and 34B slide in the y direction, and the slider 34C slides in the x direction.

On the side plate 28B3, the release port 36 is attached, and the introduction port 38 is attached. On the side plate 28B4, the release port 40 is attached. Each of the ports 36, 38, and 40 has a valve. Alternatively, any of the ports may be provided on the ceiling plate 28C.

On the ceiling plate 28C, the terminals 52 and 54 are attached. The terminal 52 and one terminal of the secondary battery 32 are connected with each other by the cable 64, and the terminal 54 and the other terminal of the secondary battery 32 are connected with each other by the cable 66.

In the illustrated example configuration, the first tool unit 56 is attached on the side plate 28B4, and the second tool unit 58 is attached on the ceiling plate 28C.

The first tool unit 56 is formed from a first tool 60 and a first holder 62. The first tool 60 extends along a center axis thereof, and is, for example, a ceramic cuter having an electrical insulating property. The first tool 60 is formed from a tip part 60*a*, a handle 60*b*, and an intermediate part 60*c*.

The tip part 60*a* is a sharp portion for forming an opening on the outer housing of the secondary battery 32 in the sealed container 28. The tip part 60*a* has a steeple shape, a tapered shape, a circular conical shape, or the like. Alternatively, a knife shape may be employed as the form of the tip part 60*a*. The handle 60*b* is a bar-shaped portion manipulated by the user outside the sealed container 28. The part between the tip part 60*a* and the handle 60*b* is the intermediate part 60*c*, which corresponds to a shaft. The intermediate part 60*c* is held by the first holder 62.

The first holder 62 is a structure which holds the first tool 60 while maintaining the airtightness of the sealed container 28, and while allowing an advancing/retreating movement and a tilting movement of the first tool 60. The first holder 62 is fixed on the side plate 28B4. The first holder 62 has a ball-joint structure. This structure will be described later in detail. A terminal surface (primary surface) of the secondary battery 32 opposes an inner surface of the side plate 28B4.

A center axis of the first holder 62 is orthogonal to the side plate 28B4. In other words, the center axis of the first holder 62 is parallel to the x direction. The center axis of the first holder 62 passes through a region near a center part of the terminal surface of the secondary battery 32. The advancing/retreating movement of the first tool 60 is a movement along the center axis of the first tool 60. The tilting movement of the first tool 60 is a movement to tilt or rotate the center axis of the first tool 60 with respect to the center axis of the first holder 62. The first tool 60 can be freely tilted in the y direction and the z direction.

For example, in a state in which the first tool 60 is retracted; that is, in a state in which the first tool 60 is located at a position distanced from the secondary battery 32, the handle 60*b* is manipulated; that is, the orientation of the first tool 60 is determined (refer to reference numeral 78), so as to direct the tip part 60*a* toward a target position on the outer housing of the secondary battery 32. Then, the handle 60*b* is pressed so that the tip part 60*a* reaches the target position (refer to reference numeral 80). With a forward movement of the first tool 60, while the tip part 60*a* is piercing the target position, an opening (a hole or a cleavage) is formed on the outer housing of the secondary battery 32. Alternatively, the tip part 60*a* may be laterally moved, to form a slit on the outer housing of the secondary battery 32. From the opening formed by the first tool 60, the contents of the secondary battery leak. The contents include gas. Alternatively, gas is generated from the leaked contents. The gas is a measurement target or an analysis target.

The second tool unit 58 is provided at a position distanced from the first tool unit 56. The second tool unit 58 has a structure similar to that of the first tool unit 56. Specifically, the second tool unit 58 is formed from a second tool 74 and a second holder 76. The second tool 74 extends along a center axis thereof, and is, for example, a ceramic cutter. The second tool 74 is formed from a tip part 74*a*, a handle 74*b*, and an intermediate part 74*c*.

The tip part 74*a* is a sharp portion for forming an opening on the outer housing of the secondary battery 32 in the sealed container 28. A shape of the tip part 74*a* is identical to the shape of the tip part 60*a*. Alternatively, different shapes may be employed for the two tip parts 60*a* and 74*a*. The handle 74*b* is a part manipulated by the user outside the sealed container 28. A part between the tip part 74*a* and the handle 74*b* is the intermediate part 74*c*. The intermediate part 74*c* is held by the second holder 76.

The second holder 76 is a structure which holds the second tool 74 while maintaining the airtightness of the sealed container 28 and while allowing an advancing/retreating movement and a tilting movement of the second tool 74. The second holder 76 is attached to the ceiling plate 28C. The second holder 76 has a ball-joint structure. A particular side surface of the secondary battery 32 (an upper surface in FIG. 2) opposes an inner surface of the ceiling plate 28C.

A center axis of the second holder 76 is orthogonal to the ceiling plate 28C, and is parallel to the z direction. The center axis of the second holder 76 passes through a region near an end of a particular side surface of the secondary battery 32 (a part near the primary surface).

The advancing/retreating movement of the second tool 74 is a movement along a center axis of the second tool 74 (refer to reference numeral 84). The tilting movement of the second tool 74 is a movement to tilt the center axis of the second tool 74 with respect to the center axis of the second holder 76 (refer to reference numeral 82). The second tool 74 may be freely tilted in the x direction and the y direction. A manipulation method of the second tool 74 is similar to the manipulation method of the first tool 60.

Figure 3:
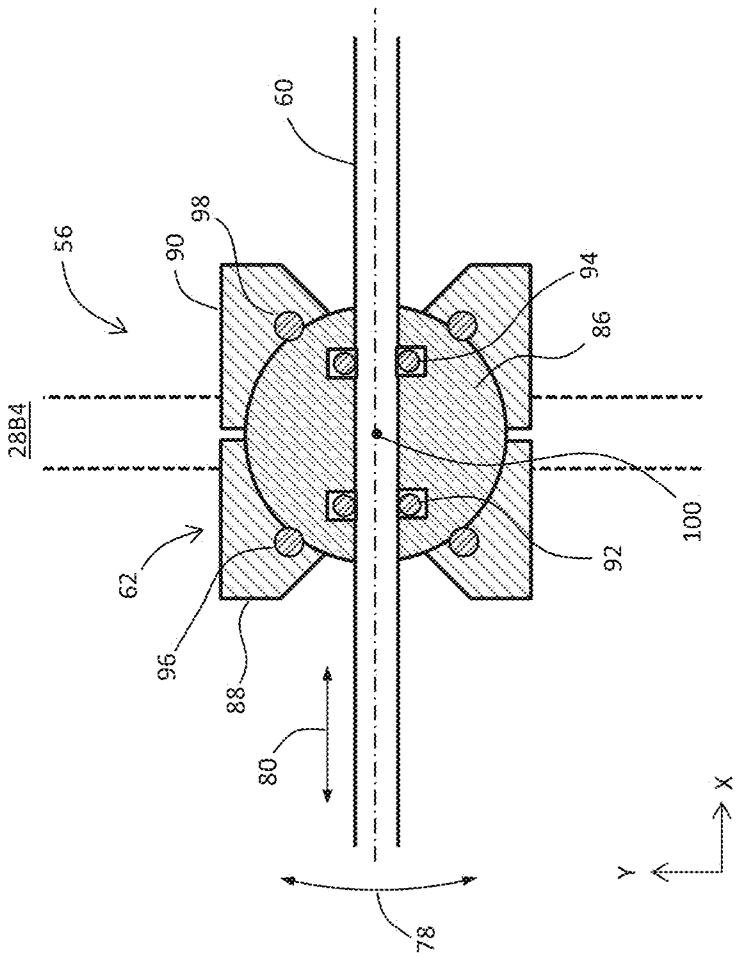
FIG. 3 is a diagram showing an example of a holder.

FIG. 3 shows a structure of the first tool unit 56. The second tool unit also has a structure similar to the structure shown in FIG. 3.

As already described, the first holder 62 holds the first tool while maintaining the airtightness of the sealed container and while allowing an advancing/retreating movement and a tilting movement of the first tool 60. More specifically, the first holder 62 has a ball 86, an outer casing 88, and an inner casing 90. The ball 86 has a through hole. The intermediate part of the first tool 60 is inserted through the through hole. In the through hole, O rings 92 and 94 are placed. The O rings are sealing members for maintaining the airtightness during the advancing/retreating movement of the first tool 60.

The outer casing 88 and the inner casing 90 are members which hold the ball 86 in a rotatable manner. An O ring 96 is placed in the outer casing 88, and an O ring 98 is placed in the inner casing 90. The O rings 96 and 98 are sealing members for maintaining the airtightness during the tilting movement of the first tool 60; that is, a rotational movement of the ball 86.

The outer casing 88 and the inner casing 90 are fixed on the side plate 28B4. Reference numeral 80 shows the advancing/retreating movement of the first tool 60. Reference numeral 78 shows the tilting movement of the first tool 60. Reference numeral 100 shows an origin for the tilting movement (rotational movement) of the first tool 60. The origin 100 coincides with the center of the ball 86.

The first holder 62 has an airtight structure and a ball-joint structure. With this configuration, the airtightness of the sealed container is maintained during the movement of the first tool 60, and a space which the tip part of the first tool 60 can reach is enlarged. Alternatively, other structures may be employed as the structure of the first holder 62.

Figure 4:
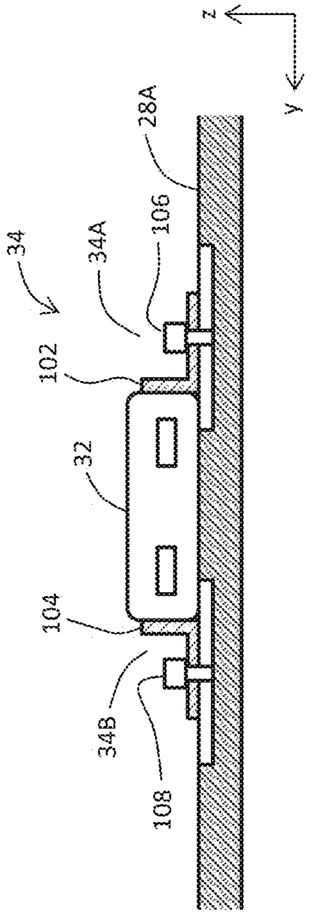
FIG. 4 is a diagram showing an example of a fixing device.

FIG. 4 shows a specific example structure of the fixing device 34. The secondary battery 32 is placed on the bottom plate 28A. As already described, the fixing device 34 has three sliders, including the sliders 34A and 34B (the slider 34C does not appear in FIG. 4). The sliders 34A and 34B are formed respectively from metal fittings 102 and 104 having an L shape, and slide pins 106 and 108. Each of the slide pins 106 and 108 is a screw or a bolt. Alternatively, other fixing devices may be provided as the fixing device 34.

Figure 5:
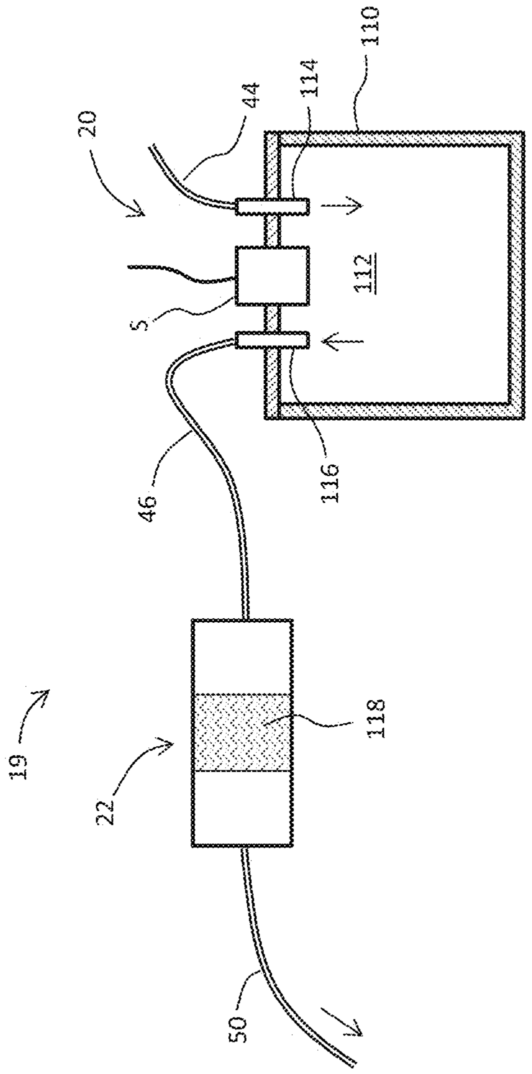
FIG. 5 is a diagram showing an example of a trap apparatus.

FIG. 5 shows a specific example structure of the trap apparatus 19. The trap apparatus 19 is formed from the buffer tank 20 and the filter 22. The buffer tank 20 has a container 110 which stores liquid or solid. An introduction nozzle 114 and a release nozzle 116 are provided on an upper plate of the container 110. The tube 44 is connected to the introduction nozzle 114, and the tube 46 is connected to the release nozzle 116.

Gas released from the sealed container is introduced via the tube 44 and the introduction nozzle 114 into an inside 112 of the container 110. The gas is sent from the inside 112 via the release nozzle 116 to the tube 46. The inside of the mass spectrometer is at a negative pressure, and the gas in the sealed container flows from the sealed container via the trap apparatus 19 to the mass spectrometer. Such a flow of gas is accelerated by the purge gas.

When liquid or solid is introduced to the inside 112 of the container 110, such contents remain in the inside 112. The pressure sensor S is provided on the upper plate. A pressure of the inside 112 is detected by the pressure sensor S. Based on a detection signal of the pressure sensor S, storage of a certain amount of contents in the container 110 is judged. Alternatively, clogging of the tube may be judged based on the detection signal of the pressure sensor S.

The filter 22 has a quartz glass fiber (quarts glass wool). Solid particles and liquid drops are trapped with the quartz glass fiber. Alternatively, other filters may be provided as the filter 22. The tube 46 is provided between the buffer tank 20 and the filter 22. The tube 50 is provided between the filter 22 and the mass spectrometer.

Figure 6:
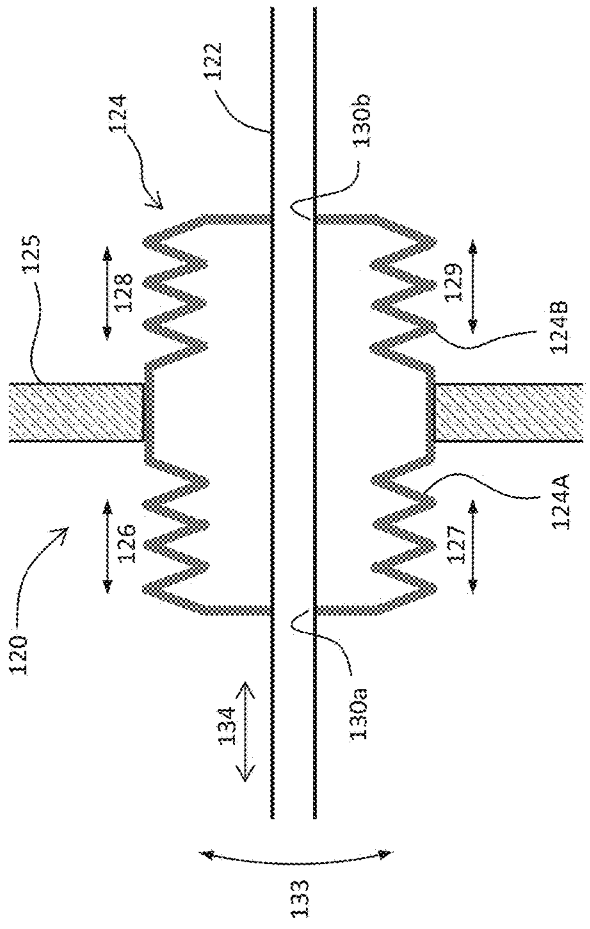
FIG. 6 is a diagram showing another example of the holder.

FIG. 6 shows another example structure of the tool unit. A tool unit 120 may be used as the first tool unit or the second tool unit. The tool unit 120 is formed from a tool 122 and a holder 124. The tool 122 is, for example, a ceramic cutter.

The holder 124 is fixed on a side plate or a ceiling plate 125. The holder 124 is formed from an outer bellows 124A and an inner bellows 124B. Each of the outer bellows 124A and the inner bellows 124B has a plurality of structural units of connected structures. Each structural unit is a connected structure of a mountain fold and a valley fold. Openings 130*a* and 130*b* are respectively formed on the outer bellows 124A and the inner bellows 124B, and the tool 122 passes through these openings 130*a* and 130*b*. The two openings 130*a* and 130*b* and the tool 122 are adhered with each other, so as to secure airtightness.

With the advancing/retreating movement of the tool 122 (refer to reference numeral 134), the outer bellows 124A and the inner bellows 124B expand or retract (refer to reference numerals 126 to 129). With the tilting movement of the tool 122 (refer to reference numeral 133), the outer bellows 124A and the inner bellows 124B deform (including expansion and contraction) (refer to reference numerals 126 to 129). In this manner, the holder 124 has a bellows structure, and holds the tool 122 while maintaining the airtightness of the sealed container, while allowing the advancing/retreating movement and the tilting movement of the tool 122.

Figure 7:
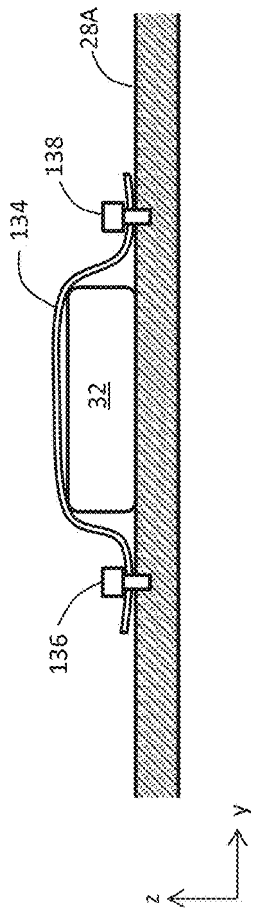
FIG. 7 is a diagram showing another example of the fixing device.

FIG. 7 shows another example of the fixing device. The secondary battery 32 is placed on the bottom plate 28A. The fixing device has a band 134 and pins 136 and 138. Respective ends of the band 134 are fixed by the pins 136 and 138. The band 134 has flexibility and elasticity. As illustrated, the band 134 covers the secondary battery 32, and the secondary battery 32 is constrained by the band 134.

Figure 8:
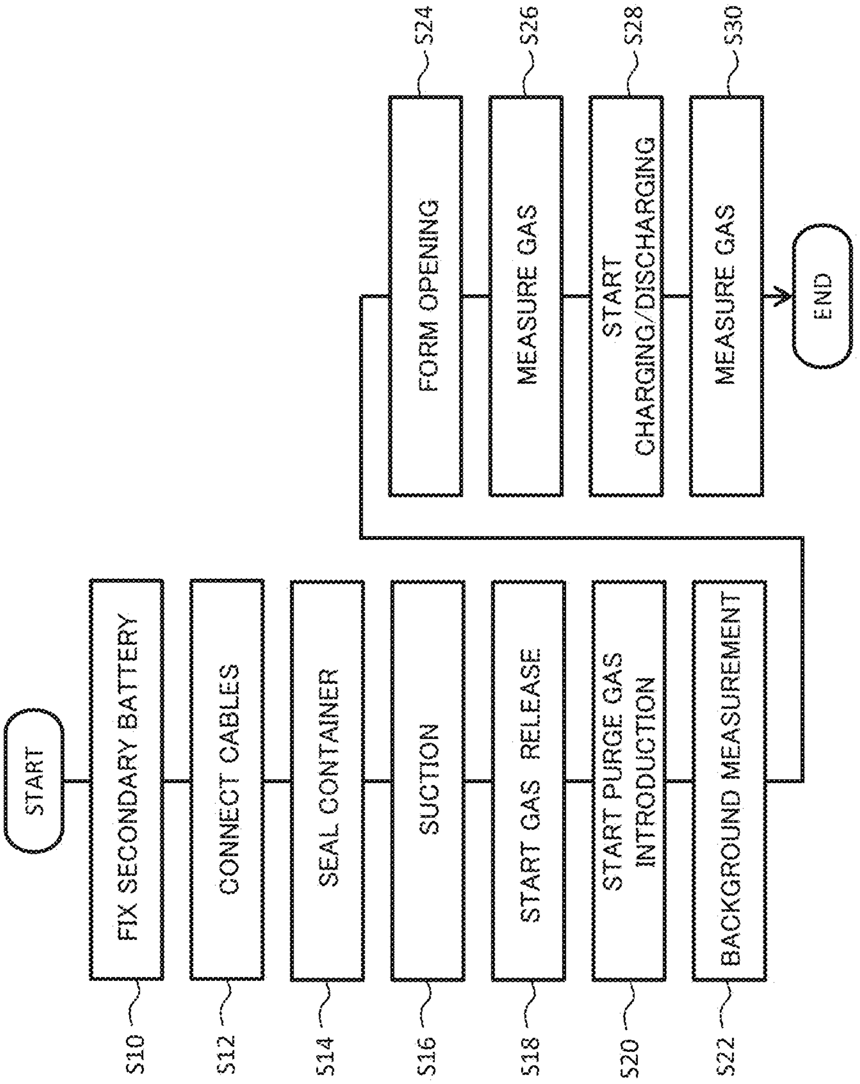
FIG. 8 is a diagram showing a first example method of testing a secondary battery according to an embodiment of the present disclosure.

FIG. 8 shows a first example method of testing a secondary battery according to an embodiment of the present disclosure. As shown in FIG. 1, a plurality of devices are connected to the secondary battery testing apparatus. In an initial state, three valves respectively provided on the two release ports and the introduction port are closed.

In S10, the secondary battery is fixed in the sealed container. In S12, two terminals of the secondary battery and two relay terminals are connected with each other by two cables. Then, in S14, an airtight state of the sealed container is formed. In S16, the valve in the release port for suctioning is opened, and an operation of the vacuum pump is started. With this process, air in the sealed container is suctioned, and, ultimately, the inside of the sealed container is set to a vacuum state. After the formation of the vacuum state, the valve in the release port for suctioning is closed, and the operation of the vacuum pump is stopped.

In S18, the valve in the release port for gas release is opened, and gas release is started. In S20, the valve in the introduction port is opened, and the purge gas is introduced into the sealed container. In this process, the flow rate of the purge gas is adjusted by the mass flow controller. Alternatively, S20 may be executed prior to S18. In S22, background measurement is performed prior to the gas measurement. More specifically, the components included in the atmospheric air are measured with the mass spectrometer. After the detection values of these components are stabilized, the gas measurement described below is started.

Specifically, in S24, first, one of the first tool unit and the second tool unit is selected by the user. Normally, the tool unit to be used is selected according to an opening formation position (target position) on the outer housing of the secondary battery in the sealed container. The user uses the selected tool unit, to form an opening on the outer housing of the secondary battery. Through this opening, gas in the secondary battery leaks, or the contents in the secondary battery leak. Gas is generated from the leaked contents.

In S26, the gas released in the sealed container is mass-analyzed by the mass spectrometer. Specifically, a mass spectrum of the gas is produced. Based on the mass spectrum, one or a plurality of components included in the gas are specified.

When it is desired to measure the gas which is generated during charging or discharging, S28 and S30 are executed. In S28, the charge/discharge test is started by the charge/discharge testing machine. For example, first, a charge period is set, and then, a discharge period is set. The gas generated during the charge period and the gas generated during the discharge period are analyzed through a method similar to that described above.

Figure 9:
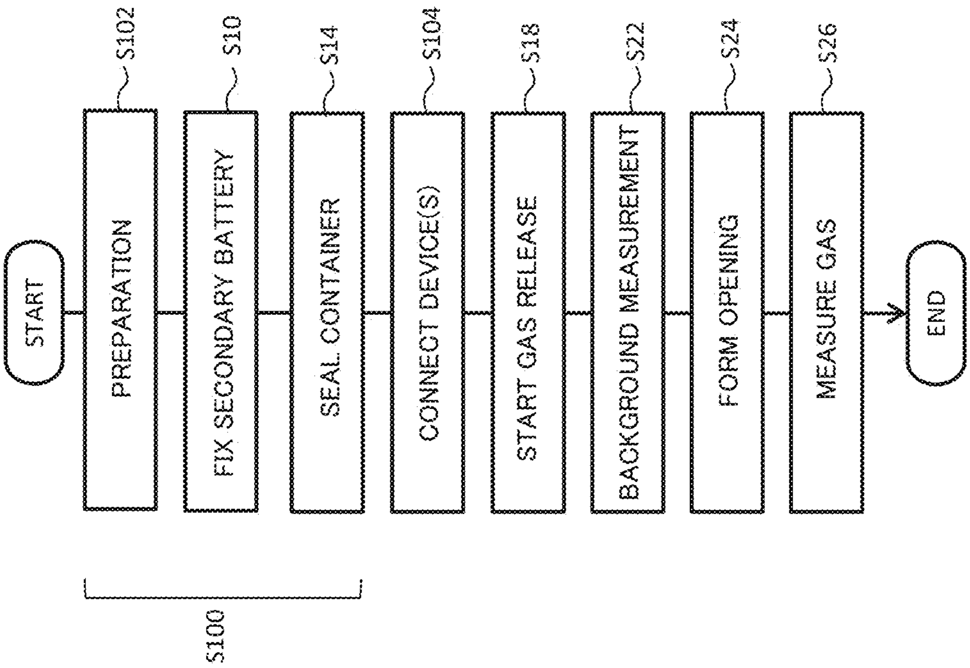
FIG. 9 is a diagram showing a second example method of testing a secondary battery according to the embodiment of the present disclosure.

FIG. 9 shows a second example method of testing a secondary battery according to the embodiment of the present disclosure. In the second example method, a glove box is used. S100 shows a plurality of steps executed using the glove box.

In S102, a secondary battery testing apparatus (more specifically, the sealed container) and the secondary battery are placed in the glove box. The inside of the glove box is filled with an inert gas (for example, argon gas). In S10, the secondary battery is fixed in the sealed container. In S14, the inside of the sealed container is set in the airtight state.

In S104, the sealed container is taken out of the glove box, and then, the devices shown in FIG. 1 are connected to the sealed container. In S18, release of gas from the sealed container is started, and in S22, the background measurement is performed. In S24, using a selected tool unit, an opening is formed on the outer housing of the secondary battery. Gas generated with this process is measured in S26.

In the example methods illustrated in FIGS. 8 and 9, the opening is formed on the outer housing of the secondary battery after the background measurement and before the charge/discharge test of the secondary battery. Alternatively, the opening may be formed on the outer housing of the secondary battery after the background measurement and after the charge/discharge test of the secondary battery. In this case also, the gas released through the opening is analyzed by the mass spectrometer.

According to the embodiment described above, secondary batteries of various sizes and various forms may be tested. In addition, an opening may be formed at a desired site on the outer housing of the secondary battery. Thus, a secondary battery testing apparatus having superior general-purpose property can be provided. Alternatively, other tests of secondary batteries and primary batteries may be performed using the above-described structure.

The invention claimed is:

1. A secondary battery testing apparatus comprising:

an airtight sealed container;

a fixing device that detachably fixes a gas releasing secondary battery in the sealed container;

a first tool that has a first tip part which forms an opening on an outer housing of the secondary battery in the sealed container, and a first handle manipulated by a user outside the sealed container;

a first holder provided on the sealed container, that holds the first tool while maintaining airtightness of the sealed container, while allowing an advancing/retreating movement and a tilting movement of the first tool; and a release outlet provided on the sealed container, that releases gas released from the secondary battery.

2. The secondary battery testing apparatus according to claim 1, further comprising:

a second tool that has a second tip part which forms an opening on the outer housing of the secondary battery in the sealed container, and a second handle manipulated by the user outside the sealed container; and a second holder provided on the sealed container at a position distanced from the first holder, that holds the second tool while maintaining airtightness of the sealed container, while allowing an advancing/retreating movement and a tilting movement of the second tool.

3. The secondary battery testing apparatus according to claim 2, wherein the sealed container has a side plate and a ceiling plate, the first holder is provided on the side plate, and the second holder is provided on the ceiling plate.

4. The secondary battery testing apparatus according to claim 2, wherein each of the first tip part and the second tip part is formed from a non-conductive material.

5. The secondary battery testing apparatus according to claim 1, wherein all or a part of the sealed container is transparent, and the secondary battery fixed in the sealed container is observable from outside the sealed container.

6. The secondary battery testing apparatus according to claim 1, further comprising:

a first relay terminal provided on the sealed container;

a second relay terminal provided on the sealed container;

a first internal cable that connects a first terminal of the secondary battery and the first relay terminal; and a second internal cable that connects a second terminal of the secondary battery and the second relay terminal, wherein each of the first relay terminal and the second relay terminal is a terminal connected to a charge/discharge testing machine.

7. A secondary battery testing system comprising:

the secondary battery testing apparatus according to claim 1;

a gas measurement apparatus that measures gas released from the release outlet; and a trap apparatus provided between the release outlet and the gas measurement apparatus, that traps contents released from the secondary battery other than the gas.

8. The secondary battery testing system according to claim 7, wherein the trap apparatus comprises:

a buffer tank which stores the contents other than the gas; and a filter provided downstream of the buffer tank, which blocks passage of the contents other than the gas.

* * * * *